Figures 1, 2, 3:
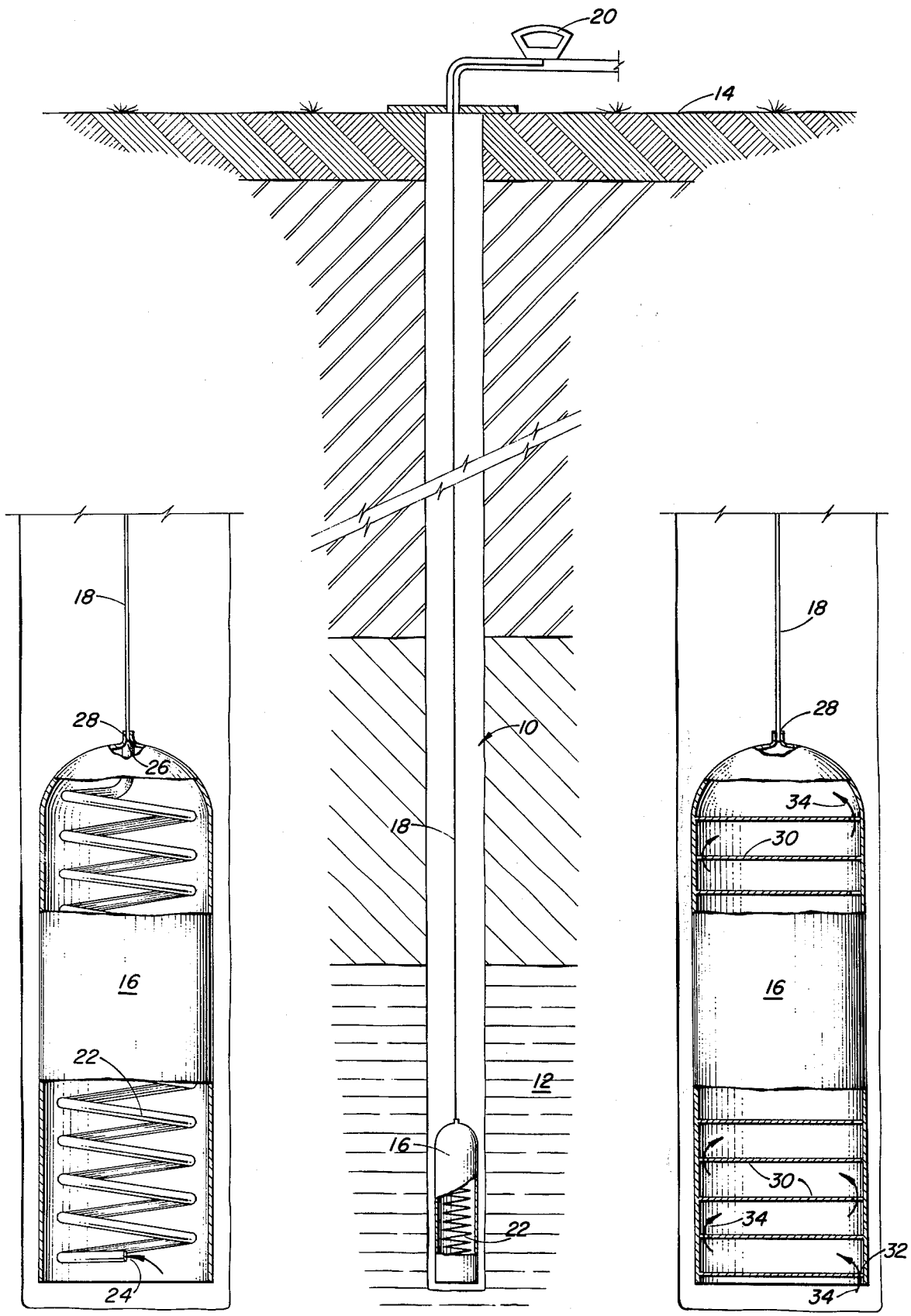

United States Patent [19]
Walther, Jr.

[11] 3,874,231
[45] Apr. 1, 1975

[54] DIFFUSION BARRIER CHAMBER FOR SPERRY SUN PERMAGAGE TYPE PRESSURE GAGE

[75] Inventor: Herbert C. Walther, Jr., Ponca City, Okla.

[73] Assignee: Continental Oil Company, Ponca City, Okla.

[22] Filed: Dec. 19, 1973

[21] Appl. No.: 426,167

[52] U.S. Cl................................... 73/151, 73/420
[51] Int. Cl............................................. E21b 47/06
[58] Field of Search ............. 73/151, 152, 395, 420

[56] References Cited
UNITED STATES PATENTS
2,855,780  10/1958  Edwards ........................... 73/152 X Primary Examiner—Jerry W. Myracle
Attorney, Agent, or Firm—F. Lindsey Scott

[57] ABSTRACT

An improvement in devices for detecting pressure and pressure changes in subterranean formations is shown. The devices comprise a chamber positioned in the wellbore and a tubular means which is in fluid communication with the chamber and a pressure sensing device. The improvement comprises positioning a baffle, a coil, or the like in the chamber to prevent the mixture of formation fluids with fluids contained in the tubular section.

8 Claims, 3 Drawing Figures

DIFFUSION BARRIER CHAMBER FOR SPERRY SUN PERMAGAGE TYPE PRESSURE GAGE

This invention is related to pressure sensing devices.

This invention further relates to pressure sensing devices for the determination of pressure and pressure changes in subterranean formations penetrated by a wellbore.

This invention further relates to an improvement in such devices whereby the accuracy is improved and greater reliability is achieved.

In the oil industry, it is desirable in many instances that a method be available for quickly and accurately determining the pressure in wellbores penetrating subterranean formations. For instance, it is possible to determine certain parameters of the formation such as the permeability, degree of damage, and the like by measurement of pressure changes as a function of time. In some instances, it is desirable to know the pressure in a wellbore penetrating a subterranean formation in order that the migration of gases into lower pressure formations and the like may be avoided or controlled. As a result, numerous devices have been proposed for measuring the pressure in subterranean formations penetrated by a wellbore.

One such system comprises a long tubular member having a small diameter, typically from about 0.020 to about 0.075 inch, which is connected at one of its ends to an open hollow chamber which is lowered into the wellbore. The other end of the tubular member is connected to a pressure sensing device at the surface, and the entire system comprising the tubular member and the chamber is filled with a gas such as helium so that upon being positioned in the subterranean formation, the formation pressure acts to force fluid up into the chamber and in some instances the tubular member, thus pressurizing the system so that the pressure may be measured at the surface. This system has many advantages since it is effective in measuring pressure in the formation; however, there are certain disadvantages which tend to adversely affect the accuracy of the test results obtained. In particular, as the formation pressure forces fluids from the formation into the chamber, it has been found that such fluids, particularly gases, tend to mix with the fluid contained in the tubular member and the chamber. This adversely affects the accuracy since the specific gravity of the gas contained in the tubular member must be of a known constant value to provide accurate measurements at the surface of the pressure in the subterranean formation. To combat this problem, the chamber has been made from one-fourth to about four times the total volume of the tubular section; however, it has been found that when substantial changes in pressure occur, both the chamber and the tubular section tend to become partially filled with fluids from the formation either as such or in admixture with the fluid originally contained in the tubular member and chamber.

In view of the continuing problem in obtaining reliable and accurate measurements of the pressure in subterranean formations, a continuing search has been directed to the development of improved methods whereby such measurements can be reliably and accurately obtained.

It is an objective of the present invention to provide a method whereby accurate and reliable measurements of the pressure in subterranean formations can be obtained.

It is a further objective of the present invention to provide an improvement in devices for measuring the pressure in subterranean formations whereby the accuracy and reliability of the results obtained by the use of such equipment can be improved.

It has now been found that the objectives of the present invention are achieved by an improvement in devices for detecting pressure and pressure changes in subterranean formations penetrated by a wellbore wherein the devices include a chamber means positioned in the wellbore and in fluid communication with the formation, a tubular means in fluid communication with the chamber means and in fluid communication with a means for detecting pressure and pressure changes in the wellbore, the improvement comprising providing means in fluid communication with the tubular means for preventing the mixture of formation fluids with fluids contained in the tubular means.

FIG. 1 shows a pressure measuring device including the improvement of the present invention in position in a subterranean formation.

FIG. 2 more particularly shows the chamber and a portion of the tubular means of FIG. 1 in conjunction with one embodiment of the improvement of the present invention.

FIG. 3 shows a view of the chamber and a portion of the tubular means of FIG. 1 in conjunction with a second embodiment of the improvement of the present invention.

FIG. 1 shows a pressure sensing device in position in a wellbore 10. The wellbore penetrates a subterranean formation 12. The pressure sensing device comprises a chamber means 16, a tubular means 18 which is in fluid communication with the chamber means and in fluid communication with a pressure sensing device 20. The pressure sensing device is located at the surface 14 and is a pressure sensing device such as is well known to those skilled in the art for determining pressure and pressure changes.

In the operation of such devices, pressure from the formation forces fluid into the chamber and, in the event of substantial pressure changes, up the tubular means for varying distances. The pressure changes which result inside the tubular means are detected by the pressure sensing means and when corrected for the pressure gradient of the fluid, preferably a gas such as helium, inside the tubular means accurately depict the pressure at the bottom of the wellbore. A major problem in the use of such devices is that when the formation fluids which enter the chamber and tubular means are gases, such gases tend to diffuse and mix with the gases inside the tubular means and the chamber, thus providing a mixture of varying gravity. It is difficult to determine the difference in the pressure measured at the surface caused by the variation in the pressure gradient caused by the mixing. As a result, the pressure determinations are less reliable and less accurate.

In FIG. 1, the improvement of the present invention is shown in the form of a coil means 22 positioned inside the chamber. The coil allows fluid from the formation to enter and move through the coil, thus transmitting the pressure to the surface. The fluid from the formation, however, does not move completely through the coil means except in those instances when extremely great pressure variations are encountered. As a result, the fluid in the tubular means remains constant and the pressure gradient is known. It is readily seen that such an improvement results in increased accuracy and reliability in the test device.

FIG. 2 shows the chamber section having a coil therein. The coil inlet 24 is positioned near the bottom of the chamber which is open to the formation fluid which enters and passes through the coil a suitable distance to transmit the pressure change to the surface. The coil outlet 26 is connected to an end 28 of the tubular means. It is readily seen that the fluids from the formation must travel a substantial distance before entering the tubular means. It is also seen that a very small pressure gradient is created by the entry of the formation fluids into the coil as opposed to the entry of such fluids into the tubular means. Desirably the coil has a flow path of at least 30 feet and preferably at least 50 feet between the inlet and the outlet, and desirably the coil has a volume equal to from about one-tenth to about 10 times the volume of the tubular section.

FIG. 3 discloses a second embodiment of the present invention wherein a series of baffles is used to prevent the entry of formation fluids into the tubular section while still allowing the pressure in the formation to force fluids into the baffle, thus transmitting the subterranean formation pressure to the surface. In particular, formation fluids enter the baffle at the baffle inlet 32 and flow around baffle plates 30 as shown by the arrows 34 to a baffle outlet 36. The baffle outlet 36 is connected to an end of the tubular means 28. It is readily seen that changes in the formation pressure are readily transmitted to the surface through the baffle arrangement without allowing the entry of formation fluids into the tubular means. Desirably the baffle has a flow path of at least 30 feet and preferably at least 50 feet between the inlet and the outlet and a volume equal to from about one-tenth to about 10 times the volume of the tubular section. The increased flow path provided by the baffles or coils is effective in preventing the entry of formation fluids into the tubular means. By the use of the improvement of the present invention, it is seen that improved reliability and accuracy are achieved. In particular, the fluid contained in the tubular means can be maintained free of fluids from the formation, thus insuring that the pressure gradient is known and remains substantially constant. Such an improvement greatly improves the accuracy and reliability of the measurements so obtained.

The baffles and coil means may be constructed of any suitable materials and are conveniently selected from those materials which are used in the fabrication of the tubular section and the chamber. Such materials are well known to those skilled in the art and need not be discussed further.

A further advantage achieved by the improvement of the present invention is that both the baffle and coil means are readily purged to remove the formation fluids which do enter the coil and baffle means. Spiral baffles are particularly preferred.

The chamber means and tubular means may of course be positioned by the use of a supporting cable, by positioning the tubular member on tubing strings and the like. In many instances, however, the tubular member provides the support required to lower and position the chamber means in the well. Such variations are well known to those skilled in the art and need not be discussed further.

It should be clearly understood that the foregoing description of preferred embodiments is illustrative rather than limiting in nature and that many variations and modifications are possible within the scope of the present invention. It is anticipated that many such variations and modifications may be considered obvious or desirable to those skilled in the art upon a review of the foregoing description of preferred embodiments and the following example.

EXAMPLE

In a well 8,000 feet deep having a bottom hole pressure of 1,500 psi and a bottom hole temperature of 180°F and using a device comprising a tubular member joining an open chamber at the bottom of the well to a pressure sensing means at the surface, the following calculations can be made.

$$P_s = P_B e^{-S/2}$$

$$S = \frac{2HG}{53.34\,TZ}$$

where;
$P_S$ = pressure at the surface (psi)
$P_B$ = pressure at the bottom of the hole (psi)
H = height of the tubular member
G = specific gravity of the gas (helium) in the tubular member
T = average temperature (°R) of the gas in the tubular member
Z = a gas constant for average temperature and pressures (assumed to be 1.0 herein)

It is thus seen that the bottom hole pressure is readily determined by the calculations shown. For instance, in the well described, assuming that the bottom hole pressure increases over a period of time to 2,000 psi forcing gas into the chamber, then the surface pressure measurement is 1,929.8 psi when the tubular member is filled with helium. By the calculations shown, the bottom hole pressure is found to be 2,000 psi.

Assuming the bottom hole pressure increases to 2,000 psi as above, methane gas is present in the well, helium is used to fill the top 6,000 feet of the tubular member, and a 50–50 mole ratio of methane and helium fills the lower 2,000 feet of the tubular member after the bottom hole pressure increases, then the pressure measured at the surface is 1,905.6 psi. Such a mixture of gases in the tubular member is typical for such wells when bottom hole pressure changes occur and in some instances with negligible bottom hole pressure changes since methane does tend to diffuse into the helium. The bottom hole pressure may similarly be calculated, but it is readily seen that an error of 24.2 psi has been introduced (1,929.8 –1,905.6), or a 4.8 percent error ([24.2/500] (100). Since it is difficult, if not impossible, to accurately determine the amount of mixing of wellbore fluids and gases with the helium, it is readily seen that improved accuracy is achieved by preventing the mixture of formation fluids and gases with the fluid or gas contained in the tubular member.

The calculations used herein are more particularly discussed in Petroleum Engineer, June, 1963, page 74.

It is readily seen that preventing the mixture of formation fluids with the fluid contained in the tubular member is of extreme importance in insuring the accuracy of the pressure measurements determined at the surface.

Having thus described the invention, I claim:

1. In a device for detecting pressure and pressure changes in a subterranean formation penetrated by a wellbore, said device including a chamber means positioned in said wellbore and in fluid communication with said formation, and a tubular means in fluid communication with said chamber means and in fluid communication with a means for detecting pressure and pressure changes in said wellbore, the improvement comprising; providing means in fluid communication with said tubular means and said formation for preventing the mixture of formation fluids with fluids contained in said tubular means, said means comprising an extended flow path in fluid communication with the lower end of said tubular means and said formation, said extended flow path being positioned to fluidly transmit pressure changes to said tubular means and prevent the entry of formation fluids into said tubular means upon changes in the formation pressure.

2. The improvement of claim 1 wherein said means for preventing the mixture of formation fluids with fluids contained in said tubular means is a baffle means positioned in said chamber means and having an inlet and an outlet so that said inlet to said baffle means is in fluid communication with said formation, said outlet from said baffle means is in fluid communication with said tubular means and the flow path between said inlet and said outlet is at least 50 feet.

3. The improvement of claim 2 wherein said fluids are gases.

4. The improvement of claim 1 wherein said means for preventing the mixture of formation fluids with fluids contained in said tubular means is a coil means positioned in said chamber means and having an inlet and an outlet so that said inlet to said coil means is in fluid communication with said formation, said outlet from said coil is in fluid communication with said tubular means and the flow path between said inlet and said outlet is at least 50 feet.

5. The improvement of claim 4 wherein said coil means has a volume equal to from 0.1 to 10 times the volume of the tubular means.

6. The improvement of claim 5 wherein said fluids are gases.

7. The method of claim 1 wherein said extended flow path is positioned to have a minimal pressure gradient.

8. The method of claim 7 wherein said extended flow path comprises a plurality of substantially horizontal flow path sections.

* * * * *